United States Patent
Ho et al.

(10) Patent No.: US 10,748,494 B1
(45) Date of Patent: Aug. 18, 2020

(54) DISPLAY DEVICE AND DISPLAY METHOD THEREOF

(71) Applicant: Wistron Corporation, New Taipei (TW)

(72) Inventors: Chien-Hsing Ho, New Taipei (TW); Chuan-Fu Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/392,604

(22) Filed: Apr. 23, 2019

(30) Foreign Application Priority Data

Jan. 28, 2019 (TW) .............................. 108103187 A

(51) Int. Cl.
*G09G 3/34* (2006.01)
*G02B 27/01* (2006.01)

(52) U.S. Cl.
CPC ......... *G09G 3/3413* (2013.01); *G02B 27/017* (2013.01); *G02B 2027/0178* (2013.01); *G09G 2320/0666* (2013.01); *G09G 2360/144* (2013.01)

(58) Field of Classification Search
CPC ......... G09G 3/3413; G09G 2320/0666; G09G 2360/144; G02B 27/017; G02B 2027/0178
See application file for complete search history.

(56) References Cited

U.S. PATENT DOCUMENTS

| | | | | |
|---|---|---|---|---|
| 6,025,823 A * | 2/2000 | Choi | ...................... | G09G 1/165 345/101 |
| 6,963,362 B1 * | 11/2005 | Nakayama | ........... | H04N 5/2354 348/224.1 |
| 10,237,527 B2 * | 3/2019 | Barron | ..................... | G06T 5/001 |
| 2007/0110426 A1 * | 5/2007 | Tokiwa | .................. | G03B 15/03 396/155 |
| 2008/0303918 A1 * | 12/2008 | Keithley | .................. | G09G 3/20 348/223.1 |
| 2009/0147098 A1 * | 6/2009 | Li | ......................... | H04N 1/6077 348/223.1 |
| 2009/0160754 A1 * | 6/2009 | Nagai | .................. | G09G 3/3406 345/102 |
| 2010/0091039 A1 * | 4/2010 | Marcu | ..................... | G09G 5/06 345/690 |
| 2014/0240341 A1 * | 8/2014 | Oda | ........................ | G09G 5/02 345/590 |

(Continued)

FOREIGN PATENT DOCUMENTS

TW    I633536    8/2018

OTHER PUBLICATIONS

"Office Action of Taiwan Counterpart Application," dated Nov. 13, 2019, p. 1-p. 7.

*Primary Examiner* — Premal R Patel
(74) *Attorney, Agent, or Firm* — JCIPRNET

(57) ABSTRACT

A display device and a display method thereof are provided. The display device includes a display, a light sensing element, and a processor. The display is configured to display an image content. The light sensing element is configured to acquire ambient light information. The processor is coupled to the display and the light sensing element, is configured to provide the image content to the display, and adjusts an output color temperature of the display toward an ambient color temperature according to the ambient light information.

20 Claims, 3 Drawing Sheets

(56) References Cited

U.S. PATENT DOCUMENTS

| | | | |
|---|---|---|---|
| 2014/0252985 A1* | 9/2014 | Huang | H05B 47/10 |
| | | | 315/294 |
| 2015/0289339 A1* | 10/2015 | Wu | H05B 45/20 |
| | | | 315/152 |
| 2016/0117996 A1* | 4/2016 | Huang | G09G 3/20 |
| | | | 345/207 |
| 2017/0213494 A1* | 7/2017 | Carlsson | G09G 3/2007 |
| 2017/0303365 A1* | 10/2017 | Chen | H05B 45/20 |
| 2018/0122309 A1* | 5/2018 | Mao | G09G 3/342 |
| 2018/0286349 A1* | 10/2018 | Mohammadi | G01K 13/00 |
| 2018/0349012 A1* | 12/2018 | Hill | G06F 3/04847 |
| 2019/0051267 A1* | 2/2019 | Johnson | G09G 5/003 |
| 2019/0130852 A1* | 5/2019 | Liao | G09G 3/3413 |
| 2019/0156715 A1* | 5/2019 | James | G06F 3/147 |

\* cited by examiner

DISPLAY DEVICE AND DISPLAY METHOD THEREOF

CROSS-REFERENCE TO RELATED APPLICATION

This application claims the priority benefit of Taiwan application serial no. 108103187, filed on Jan. 28, 2019. The entirety of the above-mentioned patent application is hereby incorporated by reference herein and made a part of this specification.

BACKGROUND

Technical Field

The disclosure relates to a display technology, and more particularly to a display device capable of adjusting an output color temperature with respect to an ambient and a display method thereof.

Description of Related Art

Augmented Reality (AR) is a technology for instantly calculating the position and angle of an image and adding corresponding graphics. The aim of such technology is to place the virtual world onto the real world and to interact on the display screen. Such technology is often applied to glasses to become AR glasses. The user can simultaneously see the real ambient and the projected virtual image by wearing the AR glasses.

In general, the lens of the AR glasses is a transparent display. When the color temperature of the virtual image generated by the AR is different from the color temperature of the current ambient, color difference between the virtual image and the actual image of the same color will appear, thereby reducing the trueness of the virtual image.

SUMMARY

Embodiments of the disclosure provide a display device and a display method thereof capable of compensating the color temperature of the displayed image, so as to display realistic images under ambient of various color temperatures.

The display device according the embodiment of the disclosure includes a display, a light sensing element, and a processor. The display is configured to display an image content. The light sensing element is configured to acquire ambient light information. The processor is coupled to the display and the light sensing element, is configured to provide the image content to the display, and adjusts an output color temperature of the display toward an ambient color temperature according to the ambient light information.

The display method according to the embodiment of the disclosure is applicable to a display device including a light sensing element and a display. The display method includes the following steps. Ambient light information is acquired using the light sensing element. An output color temperature of the display is adjusted toward an ambient color temperature according to the ambient light information.

To make the aforementioned and other features of the disclosure more comprehensible, several embodiments accompanied with drawings are described in detail as follows.

DETAILED DESCRIPTION OF DISCLOSED EMBODIMENTS

Figure 1:
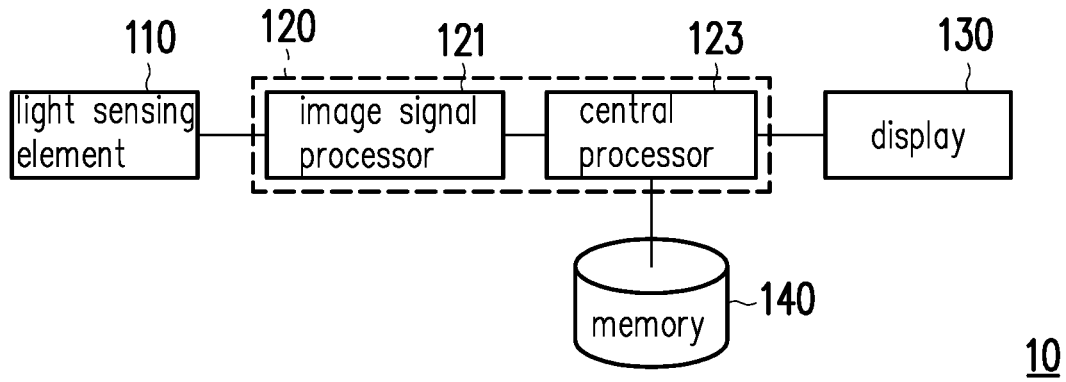
FIG. 1 is a schematic block diagram of a display device according to an embodiment of the disclosure.

FIG. 1 is a schematic block diagram of a display device according to an embodiment of the disclosure.

Referring to FIG. 1, a display device 10 includes a light sensing element 110, a processor 120, a display 130, and a memory 140, wherein the light sensing element 110, the display 130, and the memory 140 are all coupled to the processor 120. In some embodiments, the display device 10 is, for example, implemented as an augmented reality (AR) glass. However, the disclosure is not limited thereto.

The light sensing element 110 is configured to acquire ambient light information. In detail, the ambient light information is information from which relevant information regarding the color temperature of the ambient light can be acquired. As long as relevant information regarding the color temperature of the ambient light can be acquired, the present disclosure does not limit the type of the light sensing element 110 and the data type of the ambient light information.

In some embodiments, the light sensing element 110 includes, for example, a charge coupled device (CCD), a complementary metal-oxide semiconductor (CMOS) device, etc. disposed in a camera or a video camera, which can sense the intensity of the light entering the lens, so as to capture an image signal to generate and output a red-green-blue (RGB) image. The ambient light information includes the RGB image above. In some embodiments, the light sensing element 110 includes, for example, an ambient light sensor or a color-sensitive photodiode, which can be used to detect the color temperature value, the RGB component ratio (for example, the light intensity ratio of lights of three colors of R, G and B), etc. of the current ambient. The ambient light information includes the color temperature value, the RGB component ratio, etc. above.

The processor 120 is, for example, a central processing unit (CPU), other programmable general-purpose or special-purpose microprocessor, digital signal processor (DSP), programmable controller, application specific integrated circuits (ASICs), programmable logic device (PLD), image signal processor (ISP), other similar devices, or a combination of these devices. In the embodiment, the processor 120 includes an image signal processor 121 and a central processor 123 configured to provide an image content to the display 130, but the disclosure is not limited thereto.

The display 130 is configured to display the image content, such as a virtual object, from the processor 120. The display 130 is, for example, a thin film transistor liquid crystal display (TFT-LCD), a field sequential color display, an active organic light-emitting display (AMOLED), a penetrative transparent display such as an electrowetting display, or a photomechanical projective transparent display. However, the disclosure is not limited thereto and the display 130 may also be an opaque display. In some embodiments, the display 130 is implemented as a lens of the AR glass, but the disclosure is not limited thereto.

The memory 140 records programs or commands which can be loaded and executed by the processor 120, and is any type of fixed or removable random-access memory (RAM), read-only memory (ROM), flash memory (flash memory), a similar element, or a combination of the elements above. In some embodiments, a gain comparison table is further recorded in the memory 140 for lookup by the processor 120. Specific details regarding the gain comparison table will be described in the following paragraphs.

Figure 2:
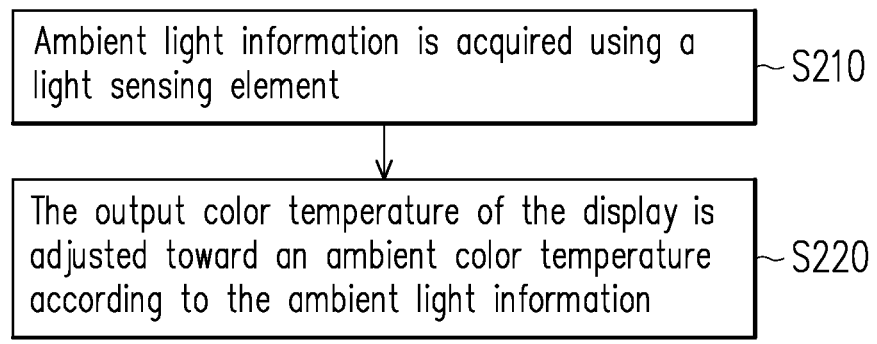
FIG. 2 is a flow chart of a display method according to an embodiment of the disclosure.

FIG. 2 is a flow chart of a display method according to an embodiment of the disclosure.

Referring to FIG. 2, firstly, a processor 120 acquires ambient light information using a light sensing element 110 (Step S210). Then, the processor 120 adjusts an output color temperature of the display 130 toward an ambient color temperature according to the ambient light information (Step S220).

Figure 3A:
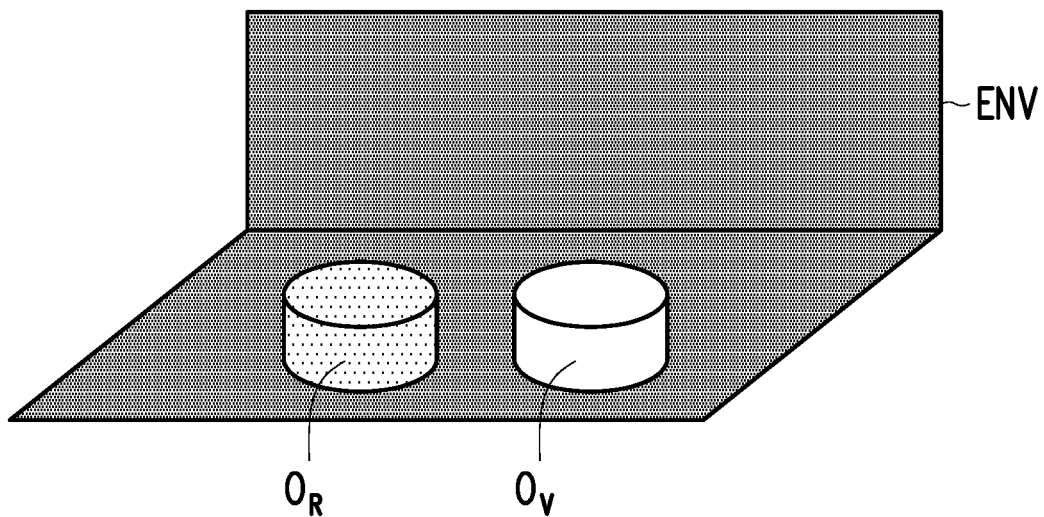
FIG. 3A and FIG. 3B are schematic diagrams of a display method according to an embodiment of the disclosure.
Figure 3B:
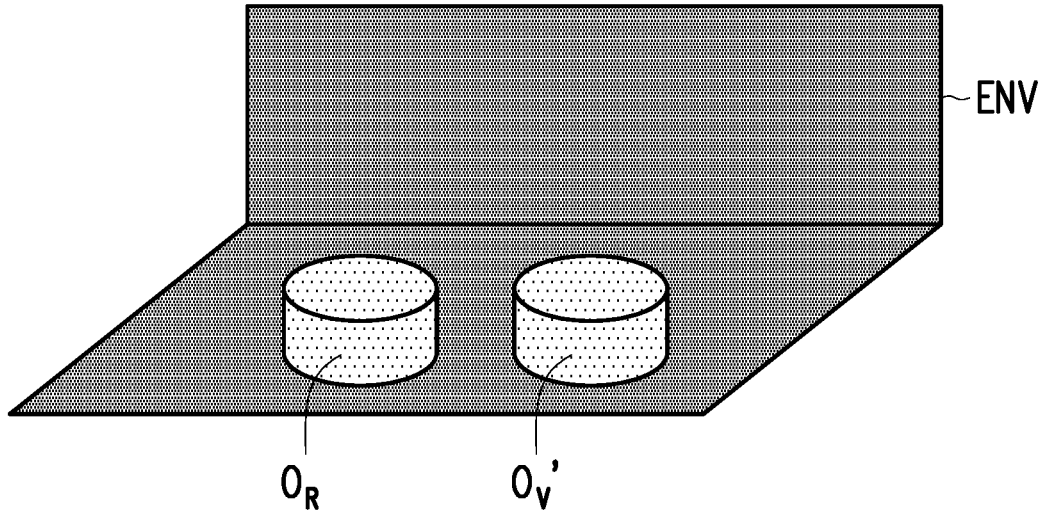

FIG. 3A and FIG. 3B are schematic diagrams of a display method according to an embodiment of the disclosure.

Referring to FIG. 3A, assuming that the ambient color temperature of an ambient ENV is 3000K and the system color temperature of a display 130 is 6500K (for example, the standard color temperature corrected during manufacturing). Since the ambient color temperature is lower, although a virtual object $O_V$ to be displayed has the same color as an actual object $O_R$, the color of the virtual object $O_V$ displayed by the display 130 is different from the color of the actual object $O_R$ located in the ambient ENV seen by the user. More specifically, seen through the display 130 by the user, the color of the actual object $O_R$ is yellower than the color of the virtual object $O_V$. On the other hand, if the ambient color temperature is higher than the system color temperature of the display 130, then seen through the display 130 by the user, the color of the actual object $O_R$ seen by the user is bluer than the color of the virtual object $O_V$.

Referring to FIG. 3B, based on the situation above, the processor 120 acquires the ambient light information of the ambient ENV using the light sensing element 110. Acquiring the ambient light information of the ambient ENV is equivalent to acquiring the relevant information regarding the color temperature of the ambient ENV. Therefore, the processor 120 is able to adjust the output color temperature of the display 130 toward the ambient color temperature according to the ambient light information. More specifically, the processor 120 adjusts the output of the display 130 to allow the color of the adjusted virtual object $O_V'$ to be closer to the color of the actual object $O_R$.

In some embodiments, when the processor 120 adjusts the output color temperature of the display 130 toward the ambient color temperature according to the ambient light information, adjusting the image content outputted by the display 130 is included. In detail, the processor 120 may first analyze the ambient light information to determine the adjustment direction before adjusting the red pixel data, the green pixel data, and the blue pixel data of the image content outputted to the display 130. Taking FIG. 3A as an example, assuming that the virtual object $O_V$ to be displayed initially is white, the processor 120, for example, adjusts the color of the virtual object $O_V$ toward yellow before outputting the virtual object $O_V'$ after the color adjustment (for example, light yellow) through the display 130.

In some embodiments, when the processor 120 adjusts the output color temperature of the display 130 toward the ambient color temperature according to the ambient light information, adjusting the backlight of the display 130 is included. In detail, the display 130 adopts, for example, an RGB backlight adopting RGB Light-Emitting Diodes (LEDs) includes a plurality of backlight RGB LEDs. The processor 120 analyzes the ambient light information to calculate an RGB gain. Then, the display 130 can adjust the RGB backlight according to the RGB gain, so as to adjust the output color temperature. For example, adjusting the RGB backlight according to the RGB gain can be adjusting at least one of the duty, the forward voltage, and the forward current of the backlight RGB LEDs, but the disclosure is not limited thereto. Persons with conventional knowledge in the art may implement according to relevant knowledge regarding the display backlight.

Two embodiments will be exemplified below to illustrate the display method that adjust the display backlight. It must be noted that these embodiments are only for illustrative purposes and are not intended to limit the disclosure.

Figure 4:
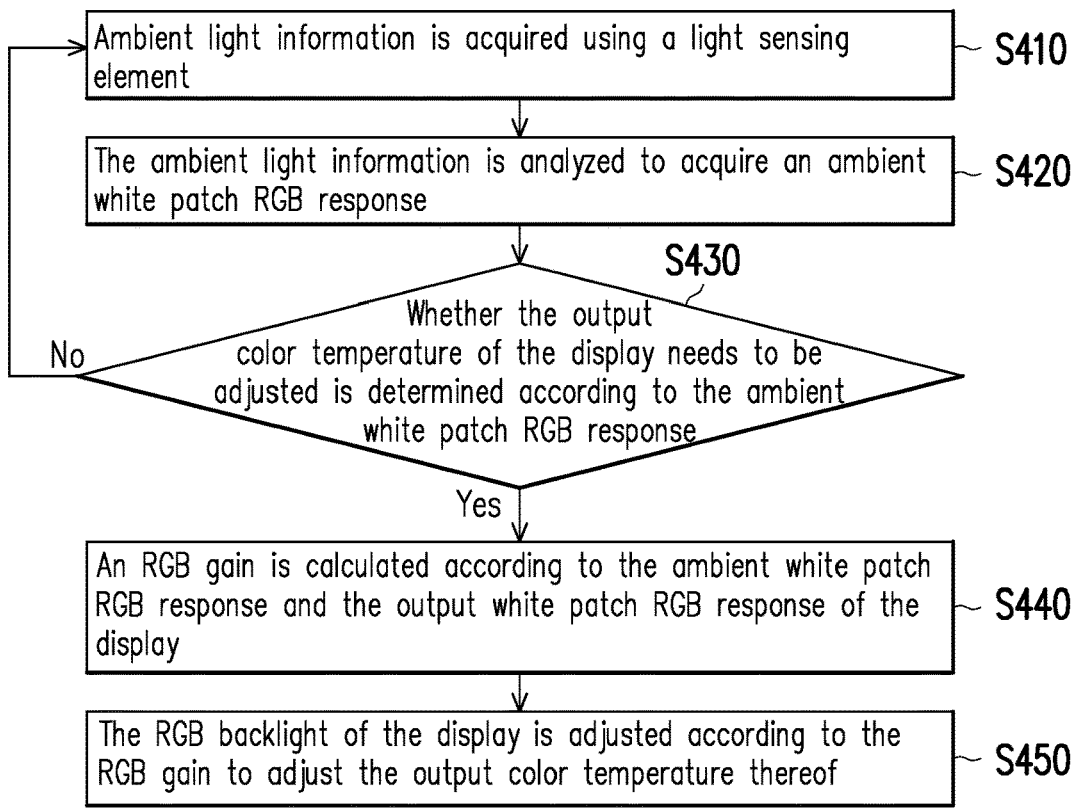
FIG. 4 is a flow chart of a display method according to an embodiment of the disclosure.

FIG. 4 is a flow chart of a display method according to an embodiment of the disclosure.

Referring to FIG. 4, firstly, a light sensing element 110 acquires ambient light information (Step S410). Then, the processor 120 analyzes the ambient light information to acquire an ambient white patch RGB response (Step S420).

In the embodiment, the ambient light information includes, for example, an RGB image. An image signal processor 121 finds a white patch or a white spot from the RGB image and uses the RGB response of the white patch or the white spot as the ambient white patch RGB response. It is worth mentioning that the disclosure does not limit the specific method of finding the white patch or the white spot from the RGB image. Persons with conventional knowledge in the art may implement according to their knowledge and needs. In the embodiment, the ambient white patch RGB response found by the image signal processor 121 is, for example, "R=1.0, G=0.5, B=1.0". It must be noted that the RGB response here is the RGB ratio acquired after normalized by the R value.

After acquiring the ambient white patch RGB response, the processor 120 determines whether the output color temperature of the display 130 needs to be adjusted according to the ambient white patch RGB response (Step S430).

In the embodiment, a central processor 123 determines whether the difference between the ambient color temperature and the system color temperature of the display 130 is greater than a preset threshold value according to the ambient white patch RGB response. If yes, the output color temperature of the display 130 needs to be compensated and the process proceeds to Step S440; if not, the output color temperature of the display 130 does not need to be compensated currently and the process returns to Step S410. For example, a memory 140 records a color temperature comparison table between the RGB response and the color temperature. The central processor 123 may look up the color temperature comparison table according to the ambient white patch RGB response to acquire the ambient color temperature and then compares the acquired ambient color temperature with the system color temperature of the display 130. When the difference between the ambient color temperature and the system color temperature is greater than the preset threshold value, the process proceeds to Step S440.

In some embodiments, when the ambient light information acquired by the light sensing element 110 also includes a color temperature value, the central processor 123 may also directly use the color temperature value acquired by the light sensing element 110 as the ambient color temperature to compare with the system color temperature of the display 130. Also, when the difference between the ambient color temperature and the system color temperature is greater than the preset threshold value, the process proceeds to Step S440.

Subsequently, the processor 120 calculates the RGB gain (Step S440) according to the ambient white patch RGB response and an output white patch RGB response of the display 130.

In the embodiment, the central processor 123 calculates the RGB gain according to the following equation:

$$T = G \cdot C + \text{Offset},$$

Where T is the target RGB response, G is the matrix formed by the RGB gain, C is the current RGB response, and Offset is, for example, the RGB response fine adjustment set according to the characteristics of hardware such as the LED during manufacturing of the display 130.

In the embodiment, the target RGB response is the ambient white patch RGB response, the current RGB response is the output white patch RGB response of the display 130 (for example, the RGB response of the corrected white patch, "R=1.0, G=1.5, B=1.1" during manufacturing), and the RGB response fine adjustment is, for example, 0. Therefore, according to the equation:

$$\begin{bmatrix} 1.0 \\ 0.5 \\ 1.0 \end{bmatrix} = \begin{bmatrix} R\_gain & 0 & 0 \\ 0 & G\_gain & 0 \\ 0 & 0 & B\_gain \end{bmatrix} \cdot \begin{bmatrix} 1.0 \\ 1.5 \\ 1.1 \end{bmatrix} + \begin{bmatrix} 0 \\ 0 \\ 0 \end{bmatrix},$$

it can be known that in the RGB gain, an R gain, R_gain, is 1.0, a G gain, G_gain, is 0.333, and a B gain, B_gain, is 0.877.

Finally, the display 130 adjusts the RGB backlight of the display 130 according to the RGB gain to adjust the output color temperature thereof (Step S450).

In the embodiment, the central processor 123, for example, outputs the RGB gain to the display 130 and the display 130 controls least one of the duty, the forward voltage, and the forward current of the backlight RGB LED according to the RGB gain. For example, the display 130 respectively multiplies the forward currents of the red, green, and blue tri-color LED in the backlight RGB LED by the R gain (for example, 1.0), the G gain (for example, 0.333), and the B gain (for example, 0.877) according to the RGB gain to adjust the color temperature of the RGB backlight.

Figure 5:
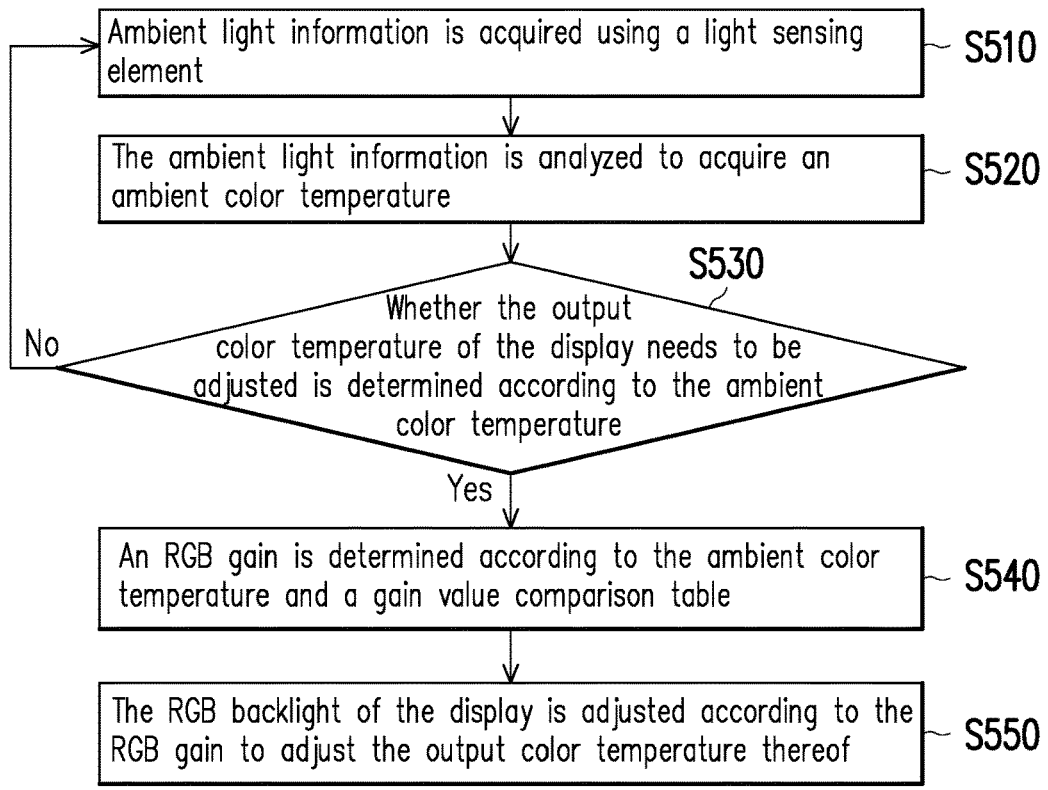
FIG. 5 is a flow chart of a display method according to an embodiment of the disclosure.

FIG. 5 is a flow chart of a display method according to an embodiment of the disclosure.

Referring to FIG. 5, first, the light sensing element 110 acquires ambient light information (Step S510). Then, the processor 120 analyzes the ambient light information to acquire an ambient color temperature (Step S520).

In the embodiment, the ambient light information includes, for example, a color temperature value. The processor 120, for example, may directly use the color temperature value in the ambient light information as the ambient color temperature. In some embodiments, the ambient light information may also be an RGB image. An image signal processor 121 finds a white patch or a white spot from the RGB image and uses the RGB response of the white patch or the white spot as the ambient white patch RGB response. Then, a central processor 123 determines the ambient color temperature according to the ambient white patch RGB response and the color temperature comparison table.

Subsequently, the processor 120 determines whether the output color temperature of the display 130 needs to be adjusted according to the ambient color temperature (Step S530).

In the embodiment, the central processor 123 determines whether the difference between the ambient color temperature and the system color temperature of the display 130 is greater than a preset threshold value. If yes, the output color temperature of the display 130 needs to be compensated and the process proceeds to Step S540; if not, the output color temperature of the display 130 does not need to be compensated and the process returns to Step S510.

Subsequently, the processor 120 determines the RGB gain according to the ambient color temperature and the gain comparison table pre-recorded in a memory 140 (Step S540).

In the embodiment, the gain comparison table records the corresponding relationship between a plurality of color temperatures and a plurality of RGB gains, as shown in Table 1 below:

TABLE I

| Ambient color temperature (K) | R gain | G gain | B gain |
|---|---|---|---|
| 3000 | 1.000 | 0.333 | 0.877 |
| 3500 | 1.000 | 0.433 | 0.895 |
| 4000 | 1.000 | 0.533 | 0.912 |
| 4500 | 1.000 | 0.633 | 0.930 |
| 5000 | 1.000 | 0.733 | 0.947 |
| 5500 | 1.000 | 0.833 | 0.965 |
| 6000 | 1.000 | 0.933 | 0.982 |
| 6500 | 1.000 | 1.000 | 1.000 |
| 7000 | 1.000 | 1.033 | 1.018 |

In the embodiment, the central processor 123 directly looks up the gain comparison table according to the ambient color temperature to determine the RGB gain. For example, if the ambient color temperature is 3000K, the central processor 123 may determine that in the RGB gain, an R gain, R_gain, is 1.0, a G_gain, G gain, is 0.333, and a B gain, B_gain, is 0.877. In some embodiments, when looking up the gain comparison table, the central processor 123 may also determine the RGB gain with simple calculations such as interpolation, but the disclosure is not limited thereto.

Finally, the display 130 adjusts the RGB backlight of the display 130 according to the RGB gain to adjust the output color temperature thereof (Step S550).

In the embodiment, the central processor 123, for example, outputs the RGB gain to the display 130. The display 130 controls at least one of the duty, the forward voltage, and the forward current of the backlight RGB LEDs according to the RGB gain. For example, the display 130 respectively multiplies the forward currents of the red, green, and blue tri-color LED in the backlight RGB LED by the R gain (for example, 1.0), the G gain (for example, 0.333), and the B gain (for example, 0.877) according to the RGB gain to adjust the color temperature of the RGB backlight.

In summary of the above, the display device and the display method according to the embodiment of the disclosure make use of the light sensing element to detect the ambient light information and then adjust the output color temperature of the display toward the ambient color temperature according to the ambient light information. As such, it is possible to compensate for the color temperature of the image displayed by the display, so as to display realistic images under ambient of various ambient temperatures.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:
 a display for displaying an image content;
 a light sensing element for acquiring an ambient light information; and
 a processor, coupled to the display and the light sensing element, for providing the image content to the display and performing a color temperature adjusting operation to adjust an output color temperature of the display toward an ambient color temperature according to the ambient light information,
 wherein the processor further calculates an red-green-blue (RGB) gain based on both a default white patch RGB response outputted by the display and the ambient light information during the color temperature adjusting operation.

2. The display device according to claim 1, wherein the display adjusts the output color temperature according to the RGB gain calculated by the processor.

3. The display device according to claim 2, wherein the display applies an RGB backlight and the display adjusts the RGB backlight according to the RGB gain to adjust the output color temperature.

4. The display device according to claim 3, wherein the display includes a plurality of backlight RGB light emitting diodes (LEDs) and the RGB backlight is adjusted through adjusting at least one of a duty, a forward voltage, and a forward current of the plurality of backlight RGB LED.

5. The display device according to claim 2, wherein the processor analyzes the ambient light information to acquire an ambient white patch RGB response and calculates the RGB gain based on both the ambient white patch RGB response and the default white patch RGB response.

6. The display device according to claim 2, further comprising:
 a memory, coupled to the processor, for recording a gain comparison table, wherein the processor determines the RGB gain according to the ambient light information and the gain comparison table.

7. The display device according to claim 1, wherein when the processor adjusts the output color temperature of the display toward the ambient color temperature according to the ambient light information, the image content is adjusted according to the ambient light information.

8. The display device according to claim 1, wherein the ambient light information comprises at least one of an RGB image, a color temperature value, and an RGB component ratio.

9. The display device according to claim 1, wherein the display is a transparent display.

10. The display device according to claim 9, wherein the display device is an augmented reality (AR) glasses and the display is a lens of the AR glasses.

11. A display method, applicable to a display device comprising a light sensing element and a display, the display method comprising:
 acquiring an ambient light information using the light sensing element; and
 adjusting an output color temperature of the display toward an ambient color temperature according to the ambient light information,
 wherein adjusting the output color temperature of the display toward the ambient color temperature according to the ambient light information comprises:
 calculating an red-green-blue (RGB) gain based on both a default white patch RGB response outputted by the display and the ambient light information.

12. The display method according to claim 11, wherein adjusting the output color temperature of the display toward the ambient color temperature according to the ambient light information further comprises:
 adjusting the output color temperature according to the RGB gain.

13. The display method according to claim 12, wherein the display applies an RGB backlight and adjusting the output color temperature according to the RGB gain comprises:
 adjusting the RGB backlight according to the RGB gain to adjust the output color temperature.

14. The display method according to claim 13, wherein the display comprises a plurality of backlight RGB LEDs and adjusting the RGB backlight according to the RGB gain comprises:
 adjusting at least one of a duty, a forward voltage, and a forward current of the plurality of backlight RGB LEDs according to the RGB gain.

15. The display method according to claim 12, wherein the display device further records a gain comparison table and calculating the RGB gain according to the ambient light information comprises:
 determining the RGB gain according to the ambient light information and the gain comparison table.

16. The display method according to claim 11, wherein calculating the RGB gain based on both the default white patch RGB response outputted by the display and the ambient light information comprises:
 analyzing the ambient light information to acquire an ambient white patch RGB response; and
 calculating the RGB gain based on both the ambient white patch RGB response and the default white patch RGB response.

17. The display method according to claim 11, wherein adjusting the output color temperature of the display toward the ambient color temperature according to the ambient light information further comprises:
 adjusting an image content provided to the display according to the ambient light information.

18. The display method according to claim 11, wherein the ambient light information comprises at least one of an RGB image, a color temperature value, and an RGB component ratio.

19. The display method according to claim 11, wherein the display is a transparent display.

20. The display method according to claim 19, wherein the display device is an AR glasses and the display is a lens of the AR glasses.

* * * * *